(12) United States Patent
Pamula et al.

(10) Patent No.: US 12,072,089 B2
(45) Date of Patent: Aug. 27, 2024

(54) POWER GENERATION DEVICES AND METHODS FOR USE WITH TOILETS

(71) Applicants: Ganapathi Pamula, Cary, NC (US); Shubham Mathur, Raleigh, NC (US); Snehil Mathur, Raleigh, NC (US); Vamsee Pamula, Cary, NC (US)

(72) Inventors: Ganapathi Pamula, Cary, NC (US); Shubham Mathur, Raleigh, NC (US); Snehil Mathur, Raleigh, NC (US); Vamsee Pamula, Cary, NC (US)

( * ) Notice: Subject to any disclaimer, the term of this patent is extended or adjusted under 35 U.S.C. 154(b) by 0 days.

(21) Appl. No.: 17/894,495

(22) Filed: Aug. 24, 2022

(65) Prior Publication Data
US 2022/0412067 A1     Dec. 29, 2022

Related U.S. Application Data

(63) Continuation of application No. 16/184,279, filed on Nov. 8, 2018, now abandoned.

(51) Int. Cl.
| | |
|---|---|
| *F21V 33/00* | (2006.01) |
| *E03D 11/00* | (2006.01) |
| *F03D 9/00* | (2016.01) |
| *G08B 5/36* | (2006.01) |
| *H02J 3/38* | (2006.01) |
| *H02J 7/34* | (2006.01) |
| *H02J 7/35* | (2006.01) |

(Continued)

(52) U.S. Cl.
CPC ............ *F21V 33/004* (2013.01); *E03D 11/00* (2013.01); *F03D 9/00* (2013.01); *G08B 5/36* (2013.01); *H02J 3/388* (2020.01); *H02J 7/34* (2013.01); *H02J 7/35* (2013.01); *H02N 2/181* (2013.01); *H02S 10/12* (2014.12); *H02S 10/20* (2014.12)

(58) Field of Classification Search
CPC ........ F21V 33/004; H02S 10/12; H02S 10/20; H02J 3/388; H02J 7/34; H02J 7/35; E03D 11/00; F03D 9/00; G08B 5/36; H02N 2/181
USPC .......................................................... 307/72
See application file for complete search history.

(56) References Cited

U.S. PATENT DOCUMENTS

| | | | |
|---|---|---|---|
| 8,274,383 B2 * | 9/2012 | Mitchell | ................. G07C 5/08 180/207.1 |
| 2006/0077652 A1 | 4/2006 | Theus | |

(Continued)

OTHER PUBLICATIONS

Ieropoulos et al. Pee power urinal—microbial fuel cell technology field trials in the context of sanitation, 2016, Environmental Science Water Research & Technology (Year: 2016).

*Primary Examiner* — Michael R. Fin
(74) *Attorney, Agent, or Firm* — E. Eric Mills; Nicholas P. Stadnyk; Maynard Nexsen PC (57) ABSTRACT

Power generation devices and methods for use with toilets is disclosed. A number of power generation devices are provided that can be used in combination to power various features in a toilet which will be particularly useful for portable toilets that are off the grid. The power generation devices and methods include, for example, using a cell battery inside a toilet water source, a wind turbine, solar panels, and piezoelectricity. The features include, for example, lighting up the toilet with light-emitting diodes (LEDs) to make it easier for users to find the toilet, an audio/video setup for entertainment, and a toilet status light indicator to let the next user know when the toilet paper is out.

8 Claims, 11 Drawing Sheets

(51) Int. Cl.
    *H02N 2/18*     (2006.01)
    *H02S 10/12*     (2014.01)
    *H02S 10/20*     (2014.01)

(56) References Cited

U.S. PATENT DOCUMENTS

| | | | |
|---|---|---|---|
| 2008/0041711 A1* | 2/2008 | Herber | H01H 3/141 |
| | | | 200/85 R |
| 2012/0023651 A1 | 2/2012 | Taylor | |
| 2012/0068613 A1 | 3/2012 | Veneto | |
| 2013/0208452 A1* | 8/2013 | Maxwell | F21V 33/004 |
| | | | 362/101 |
| 2014/0370334 A1 | 12/2014 | Siegrist | |
| 2016/0262580 A1* | 9/2016 | Fellhoelter | A47K 10/3687 |
| 2018/0008855 A1* | 1/2018 | Yanev | A63B 24/0087 |
| 2018/0024352 A1* | 1/2018 | Singh | G06V 10/12 |
| | | | 340/8.1 |
| 2019/0203453 A1 | 7/2019 | Lipinski | |

* cited by examiner

(BOTTOM VIEW)

FIG. 9

POWER GENERATION DEVICES AND METHODS FOR USE WITH TOILETS

CROSS-REFERENCE TO RELATED APPLICATIONS

The presently disclosed subject matter is a continuation application of U.S. patent application Ser. No. 16/184,279 entitled "Power Generation Devices and Methods for Use with Toilets," filed on Nov. 8, 2018; the entire disclosure of which is incorporated herein by reference.

TECHNICAL FIELD

The presently disclosed subject matter relates generally to power generation devices and more particularly to power generation devices and methods for use with toilets.

BACKGROUND

Turning on a bright light when entering a bathroom during the night after being asleep can be a largely discomforting experience in that the bright lights can blind and hurt one's eyes after said eyes have adjusted to darkness. After using the toilet and returning to bed, a person may encounter further difficulties because his or her eyes are no longer acclimated to the dark. For these reasons, a person may choose to leave the lights off when walking into a bathroom which can potentially lead to injury as the person is in danger of tripping over objects lying around. Therefore, a mechanism that provides a continuous soft light may be in a person's best interests. However, powering these lights could lead to long term costs if they are powered by a battery or a home's electricity system. Further, with respect to portable toilets, portable toilets are efficient because they are completely disconnected from any power grid, but because of that, any electronic features must be powered by other sources.

Currently, power sources in, on, and/or near toilets exist. For example, power sources can include electrodes in the flush tank, piezo materials in the seat/floor, and, specifically for portable toilets, wind and solar power so that the energy usage is not reflected in the home and the entire structure can be mobile if needed. However, such power sources may be complex, bulky, and expensive.

Another problem people encounter with some frequency is realizing too late that the toilet paper roll is empty. This could lead to uncomfortable situations, severe embarrassment, and a horrible mess. Therefore, it may be beneficial to provide an indicator that can alert toilet users when the toilet paper is used up so that they might be prompted to get more paper before using the toilet.

SUMMARY

A power generation system and method is disclosed including a toilet component having a source of standing water and an improvement; and a power generation component operatively connected to the toilet component, the power generation component being discrete from an electrical grid and is adapted to power the improvement.

In one embodiment, the power generation component may be a cell in the source of standing water. The source of standing water may be a toilet flush tank, a toilet bowl, a rainwater barrel, a water tank, or a sewage system.

The cell may have two concentric cylinders, and one of the two concentric cylinders made of a first metal and the other of the two concentric cylinders made of a second metal. The two concentric cylinders may be an outer concentric coil and an inner concentric coil. If the improvement is an LED, the outer concentric coil is connected to the LED anode and the inner concentric coil is connected to the LED cathode.

A variety of metals are contemplated. In one embodiment, the first metal is copper aluminum, galvanized zinc, silver, or a 75% copper/25% nickel alloy. In another embodiment, the concentric coils are an outer coil made of galvanized zinc and an inner coil made of copper.

The cell may also be plural parallel cells connected in a series. The cell may be two cells separated by an insulator and rolled into a cylinder.

The improvement may be a USB charging port, a sensor, an actuator, a radio, a video display, and/or an LED to illuminate the toilet component. The improvement may be a toilet paper holder with an LED alert light, the LED alert light adapted to be turned on once toilet paper needs to be replaced.

In another embodiment, the power generation component may include a wind turbine, solar panels, electrode batteries, and piezoelectric generators that are operatively connected to charge a rechargeable battery. The wind turbine, the solar panels, the electrode batteries, and the piezoelectric generators generate power in unison or separately.

If the improvement is LEDS arranged in the toilet bowl, toilet seat, or toilet base, the power generation component may include batteries arranged in the toilet bowl that directly power the LEDS, or, alternatively, the batteries may be connected to a rechargeable battery that powers the LEDS.

The power generation component may be piezoelectric generators and a rechargeable battery. In particular, the piezoelectric generators may be two generators located between the toilet seating rim and the toilet bowl rim.

In another embodiment, the toilet component includes a floor adjacent to a toilet, and the piezoelectric generators may be beneath the floor.

In still another embodiment, the toilet component includes a toilet stool, and the piezoelectric generators are beneath the toilet stool.

The present method may include the steps of: providing a power generation system as described herein; and powering the improvement of the toilet component.

BRIEF DESCRIPTION OF DRAWINGS

Having thus described the presently disclosed subject matter in general terms, reference will now be made to the accompanying Drawings, which are not necessarily drawn to scale, and wherein:

DETAILED DESCRIPTION

The presently disclosed subject matter now will be described more fully hereinafter with reference to the accompanying Drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated Drawings. Therefore, it is to be understood that the presently disclosed subject matter is not to be limited to the specific embodiments disclosed and that modifications and other embodiments are intended to be included within the scope of the appended claims.

In some embodiments, the presently disclosed subject matter provides power generation devices and methods for use with toilets. For example, the presently disclosed power generation devices and methods may be configured to be used within a self-standing toilet which may not be connected to the electrical grid and using the sources of energy available in such a setting.

In some embodiments, power generation is provided by placing metal electrodes in a liquid container that is available within a toilet. Examples include placing a cell made of two dissimilar electrodes in the flush water tank or the toilet bowl where there is always a supply of liquid. Two such electrodes when separated in a liquid medium generate a potential and a current which can be used to drive any load such as a light-emitting diode (LED). This will be very useful in settings where there may not be any electrical power readily available or it is scarce. It can also be useful in settings with electrical power available where such an LED can be a standalone device that does not need a separate power source or a need for an electrical outlet.

In some embodiments, various schemes of generating power in portable toilets are provided which are not usually connected to a power source. For example, there are several independent sources of power that can be integrated into portable toilets of which are a windmill turbine which will extend from the top and a solar panel which can be attached to the ceiling. Both these sources will charge a battery that will in turn power the various features of the portable toilet. The wind turbine can operate while being transported in addition to charging when the wind is blowing as long as the top is exposed to the air. The solar panel can also stay operational as long the top of the portable toilet is exposed to the sun. The aforementioned features can include powering a USB charging port, radio, LEDs on the toilet seat and LEDs that indicate when the toilet paper is empty.

In some embodiments, power generation is provided in toilets utilizing piezo electricity. There are multiple locations for these generators: between the toilet rim and seat and underneath the floor mat or tiles in front of the toilet and sink area. These are all the places where pressure would normally be applied, whether it is through sitting or standing. These places have two generators each because there will be two points of contact with the person and the piezo device. Although slightly separated from the toilet and bathroom, toilet accessories may also utilize piezo electricity. One such accessory includes a toilet stool, known commercially as the Squatty-Potty®, for example, that has piezo generators underneath each "foot." The electricity generated is used to power any of the previously mentioned devices.

Figure 1A:
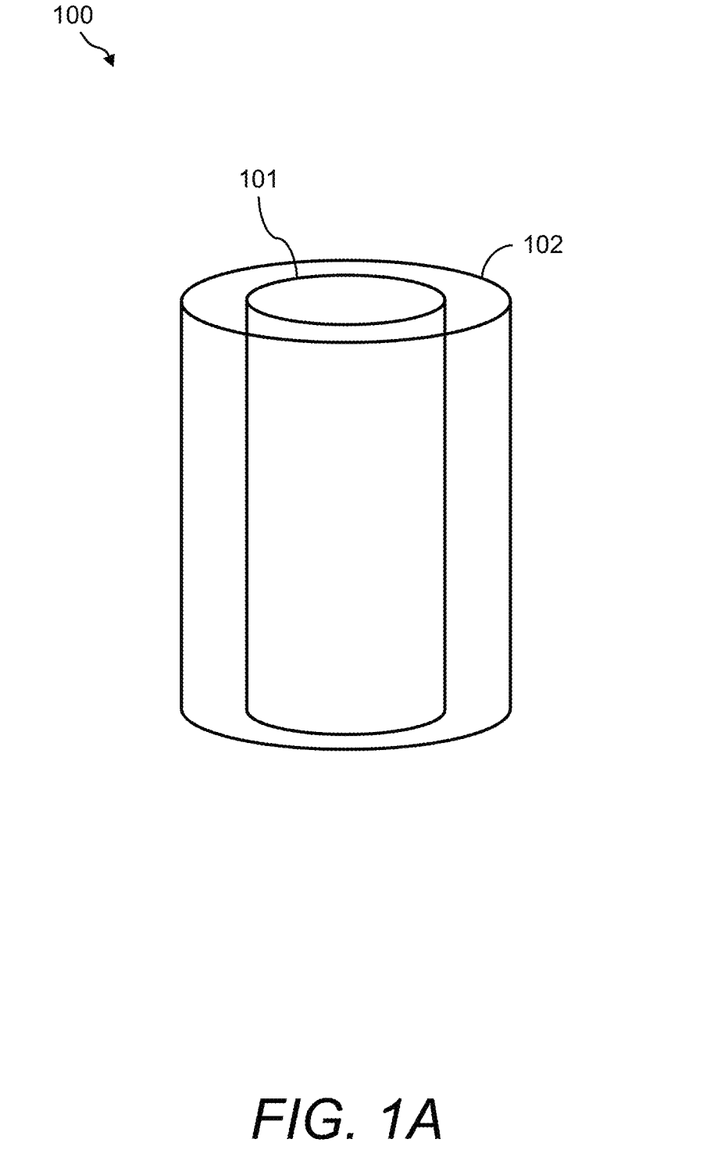
FIG. 1A, FIG. 1B, and FIG. 1C illustrate an example of the experimental power generation scheme and the basic cell used to generate electric power according to the invention.
Figure 1B:
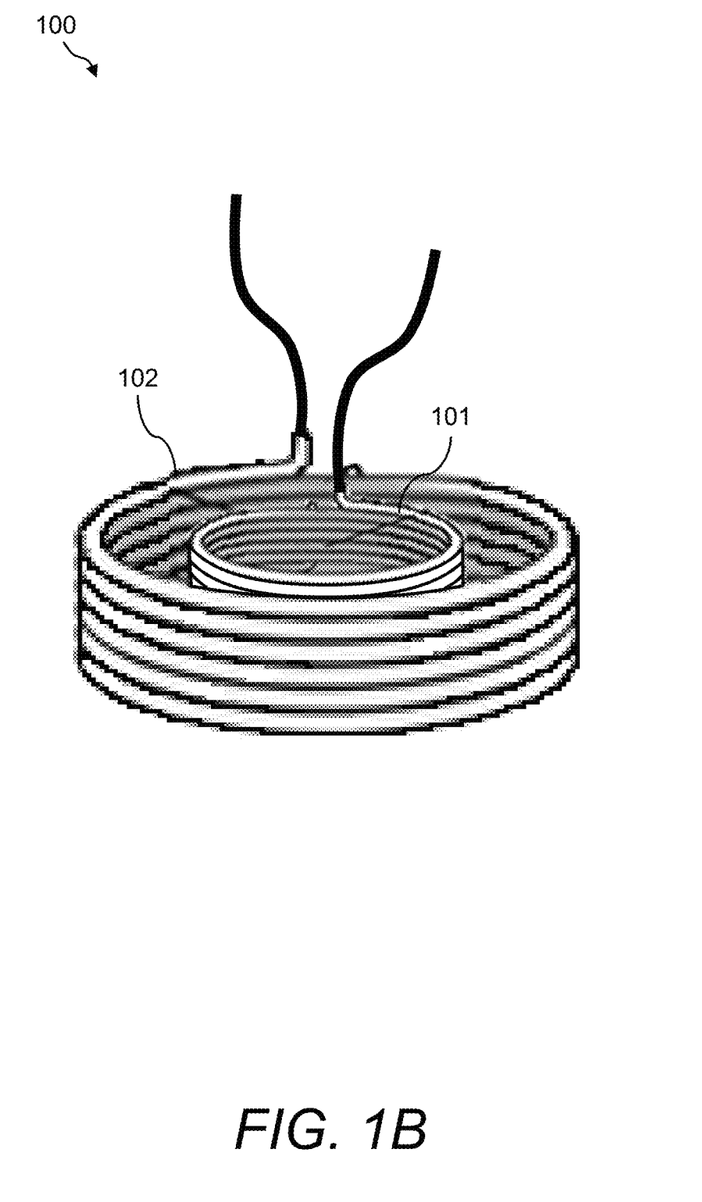
Figure 1C:
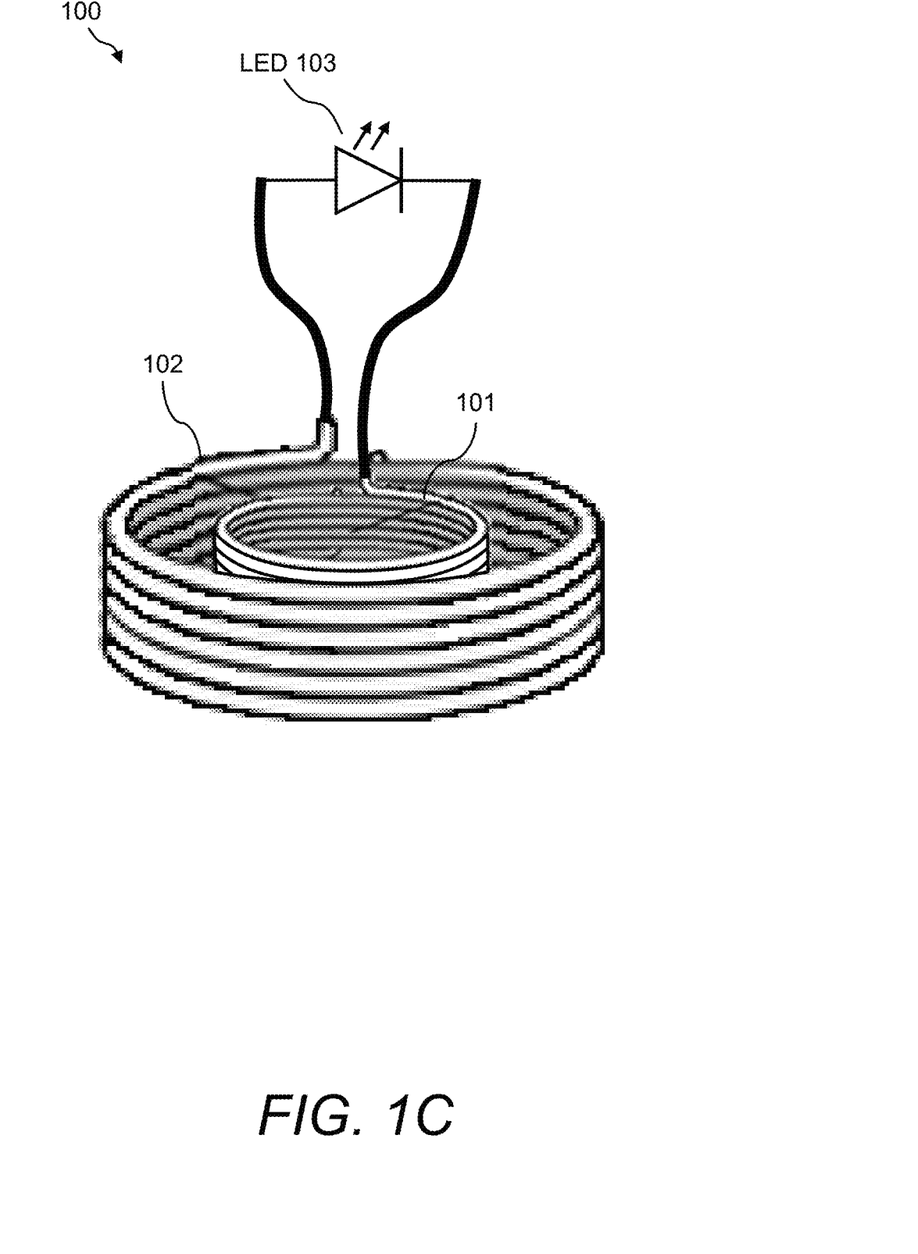

Referring now to FIG. 1A, FIG. 1B, and FIG. 1C is an example of the experimental power generation scheme and the basic cell used to generate electric power according to the invention. Namely, FIG. 1A, FIG. 1B, and FIG. 1C show the basic design of a cell 100 with two concentric cylinders (e.g., concentric coils 101, 102) made of metals comprising the electrodes. In one embodiment, the concentric cylinders of the cell 100 include an outer cylinder 102 spaced apart from an inner cylinder 101, the outer cylinder 102 having a diameter that is larger than the diameter of the inner cylinder 101. This cell 100 when immersed in a liquid medium generates a potential which is determined by the choice of materials used for the electrodes. This arrangement also generates current, which is determined by the surface area between the electrodes. For example, FIG. 1C shows the cell 100 powering an LED 103.

Several combinations of metals were tested with salt water as the electrolyte and the results are summarized in Table 1 below. Copper and galvanized zinc generated the highest amount of current at 225 µA and a high potential difference of ~0.7 V. Although steel and aluminum electrodes generated a higher potential difference of 0.86 V, the amount of current generated was lower than that generated from copper and galvanized zinc electrode combination. Silver and aluminum electrodes generated a potential difference of 0.68 V, however silver is an expensive metal so further experiments were performed only with copper and galvanized zinc electrodes.

TABLE 1

Experimental results of potential difference generated between various combinations of metals

| Cathode (down)/ Anode (right) | Copper | Aluminum | Galvanized Zinc | Silver | US 5 Cent Coin (75% Cu/25% Ni) | Steel | Brass |
| --- | --- | --- | --- | --- | --- | --- | --- |
| Copper | 0 V | −0.55 V | −0.74 V | +0.13 V | −0.01 V | +0.32 V | −0.04 V |
| Aluminum | +0.55 V | 0 V | −0.17 V | +0.68 V | +0.59 V | +0.86 V | +0.51 V |
| Galvanized Zinc | +0.7 V | +0.17 V | 0 | n/a | n/a | n/a | n/a |
| Silver | −0.11 V | −0.68 V | n/a | 0 | −0.01 V | +0.23 V | −0.15 V |

TABLE 1-continued

Experimental results of potential difference generated between various combinations of metals

| Cathode (down)/ Anode (right) | Copper | Aluminum | Galvanized Zinc | Silver | US 5 Cent Coin (75% Cu/25% Ni) | Steel | Brass |
|---|---|---|---|---|---|---|---|
| US 5 Cent Coin (75% Cu/25% Ni) | +0.01 V | −0.59 V | n/a | −0.01 V | 0 V | +0.31 V | −0.07 V |

In FIG. 1A, FIG. 1B, and FIG. 1C, the electrodes were made with copper as the inner cylinder (101) connected to a cathode and the galvanized zinc electrode as the outer cylinder (102) connected to an anode of an LED.

Galvanized zinc and silver electrodes were connected as a single cell shown in FIG. 1A, FIG. 1B, and FIG. 1C and placed in the flush tanks in four different toilets with different commercially available flush tank cleaning tablets. All the toilet flush tanks had the same water volume capacity and had the same source of water. Four identical cells, each about 1.5 inches tall were prepared and placed exactly at the same submersion depth in the flush water tank. In Flush Tank 1, Vanish Scrubbing Bubbles Continuous Clean Drop-in (Tablet 1) was added and its composition was Cleaning agent, Carrier, pH adjuster, fragrance, binders, dye chelator, SCJ Formula#35*4291. In Flush Tank 2, Clorox Bleach and Blue in 1 tablet (Tablet 2) was added and its composition was sodium alkylbenzenesulfonate, sodium lauryl sulfate, cocoamide MEA, sodium carbonate, dichlorodialkylhydantoins, and fragrance. In Flush Tank 3, D- 2000 flushes Blue plus Bleach two discs (Tablet 3) was added and its composition was 1,3-dichloro5,5-dimethylhydantoin 81.1%, 1,3-dichloro-5-ethyl, 5-methylhydantoin16.1%, Inert ingredients 2.8%, minimum available chlorine 68%. In Flush Tank 4, Clorox Bleach (Tablet 4) was added and its composition was 1-bromo-3-chloro-5,5-dimethylhydantoin 51%, 1,3-dichloro5,5-dimethylhydantoin 23.3%, 1,3-dichloro-5-ethyl, 5-methylhydantoin 9%, other ingredients 16.7%, available bromine 33.3% and available chlorine 37.7%.

Results are summarized in Table 2 below. Daily readings were taken for the first week in each of the flush tanks with different cleaning agents to determine if the cleaning agents would give any additional improvement in either the current generated or the voltage produced compared to just salt water which produced 0.7 V and 225 μAmps. It can be noted that while the voltage generated is slightly higher, the current produced is lower. Another additional reading was taken at the end of six months to assess the long term generation. It can be noted that in Flush Tank 1, where the tablet has been used up, the current generated was higher than that generated with the tablet while others had tablets remaining and there was no significant difference. From this experiment, it was determined that tablets are not necessary to improve the performance of the cell.

TABLE 2

Long term performance of the battery cell in a flush tank

| | Flush Tank 1 | | Flush Tank 2 | | Flush Tank 3 | | Flush Tank 4 | |
|---|---|---|---|---|---|---|---|---|
| Day | Volts | μ-amps | Volts | μ-amps | Volts | μ-amps | Volts | μ-amps |
| 1 | 0.81 | 77 | 0.82 | 115 | 0.82 | 109 | 0.83 | 94 |
| 2 | 0.81 | 72 | 0.77 | 94 | 0.84 | 103 | 0.86 | 94 |
| 3 | 0.81 | 77 | 0.75 | 86 | 0.85 | 103 | 0.85 | 94 |
| 4 | 0.81 | 77 | 0.72 | 80 | 0.85 | 94 | 0.85 | 88 |
| 5 | 0.81 | 76 | 0.74 | 80 | 0.83 | 82 | 0.83 | 83 |
| 6 | 0.78 | 72 | 0.71 | 74 | 0.83 | 85 | 0.86 | 96 |
| 7 | 0.71 | 92 | 0.71 | 78 | 0.8 | 83 | 0.87 | 72 |
| 180 | 0.75 | 134 | 0.71 | 95 | 0.78 | 89 | 0.75 | 67 |

Another experiment was conducted in more controlled conditions where the water, with different tablets dissolved, is dispensed into bottles and measurements were taken over 5 months. Daily readings were taken for the first week and then a final reading was taken on Day 150 to determine long term performance.

Results are summarized in Table 3. All the bottles had 100 mL of water obtained from the town municipal supply (Town of Cary, North Carolina, USA) each with a different tablet that was dissolved in a 1.6 gallon Flush Tank. Water with salt had 1 teaspoon of table salt. There was a degradation in performance after 150 days due to formation of rust in stagnant water in this experiment which was not seen in the flush tank due to the constantly refreshing water with each flush. Water with salt and with Tablet 3 gave the best performance. This was also similar to the performance obtained from human urine which is loaded with electrolytes to enhance the performance. Two individual cells (shown in FIG. 1A) were connected in parallel to generate a higher amount of current while keeping the voltage the same. This setup was sufficient to provide enough power to light up an LED 103 (shown in FIG. 1C) using salt water or urine as the electrolyte.

TABLE 3

Long term performance of the battery cell in a model system

| | Water | | Salt water | | Tablet 1 in Water | | Tablet 2 in Water | | Tablet 3 in Water | | Tablet 4 in Water | |
|---|---|---|---|---|---|---|---|---|---|---|---|---|
| Day | Volts | μ-amps | Volts | μ-amps | Volts | μ-amps | Volts | μ-amps | Volts | μ-amps | Volts | μ-amps |
| 1 | 0.83 | 109 | 0.75 | 223 | 0.79 | 91 | 0.72 | 99 | 0.88 | 102 | 0.76 | 75 |
| 2 | 0.92 | 113 | 0.75 | 211 | 0.9 | 110 | 0.76 | 123 | 0.87 | 108 | 0.82 | 82 |

TABLE 3-continued

Long term performance of the battery cell in a model system

| | Water | | Salt water | | Tablet 1 in Water | | Tablet 2 in Water | | Tablet 3 in Water | | Tablet 4 in Water | |
|---|---|---|---|---|---|---|---|---|---|---|---|---|
| Day | Volts | μ-amps | Volts | μ-amps | Volts | μ-amps | Volts | μ-amps | Volts | μ-amps | Volts | μ-amps |
| 3 | 0.81 | 94 | 0.75 | 200 | 0.85 | 85 | 0.8 | 91 | 0.9 | 85 | 0.82 | 58 |
| 4 | 0.92 | 117 | 0.76 | 221 | 0.9 | 108 | 0.78 | 102 | 0.95 | 114 | 0.89 | 71 |
| 5 | 0.89 | 100 | 0.76 | 220 | 0.86 | 105 | 0.74 | 99 | 0.94 | 121 | 0.89 | 80 |
| 6 | 0.86 | 89 | 0.7 | 203 | 0.84 | 89 | 0.72 | 89 | 0.93 | 118 | 0.87 | 80 |
| 7 | 0.86 | 84 | 0.72 | 228 | 0.83 | 81 | 0.69 | 89 | 0.93 | 115 | 0.86 | 83 |
| 150 | 0.87 | 69 | 0.72 | 82 | 0.6 | 60 | 0.48 | 46 | 0.83 | 75 | 0.69 | 54 |

Figure 2A:
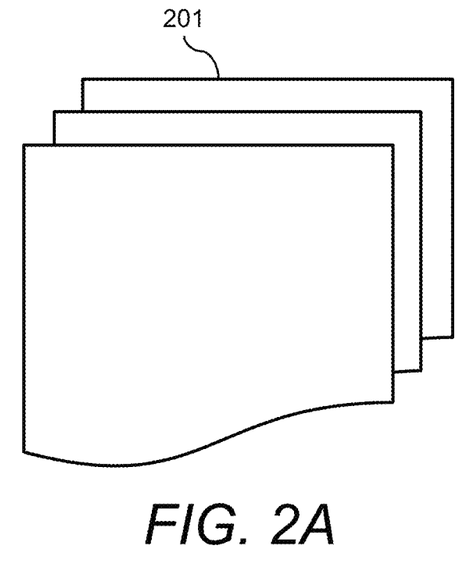
FIG. 2A and FIG. 2B illustrate an example of different ways to maximize the amount of current generated with the cells.
Figure 2B:
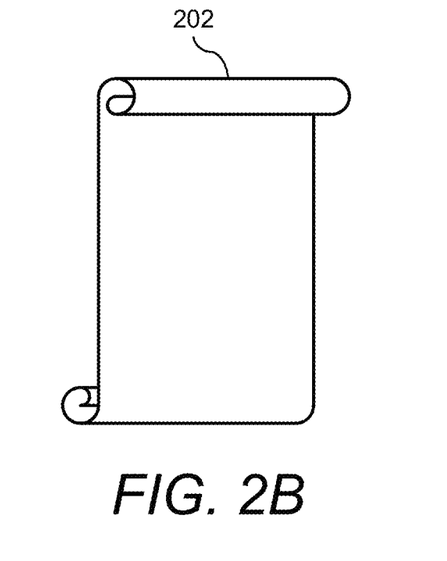

Referring now to FIG. 2A and FIG. 2B is an example of different ways to maximize the amount of current generated with the cells. Namely, FIG. 2A shows several cells 201 connected in series in order to generate a higher amount of voltage. Several cells can also be connected in parallel to generate a higher amount of current. FIG. 2B shows a setup where two electrodes 202 with large surface area are separated by an insulator to form a sandwich and then rolled into a cylindrical shape to conserve the volume of the cell while maximizing the amount of current generated. These cells can be connected in series, in parallel, or any combinations thereof to maximize the current and voltage as required. The power thus generated can be used to light up LEDs, to drive electronics including any sensors and actuators, to play audio and video, to charge devices, and other such uses. These cells can be placed in any sources of standing water such as flush tanks in a toilet, in the toilet bowl, in rainwater barrels, overhead or underground water tanks, in plumbing systems, or sewage systems. Also, these cells can be combined with other means of power generation such as piezoelectricity, wind, and solar power generation systems.

Figure 3:
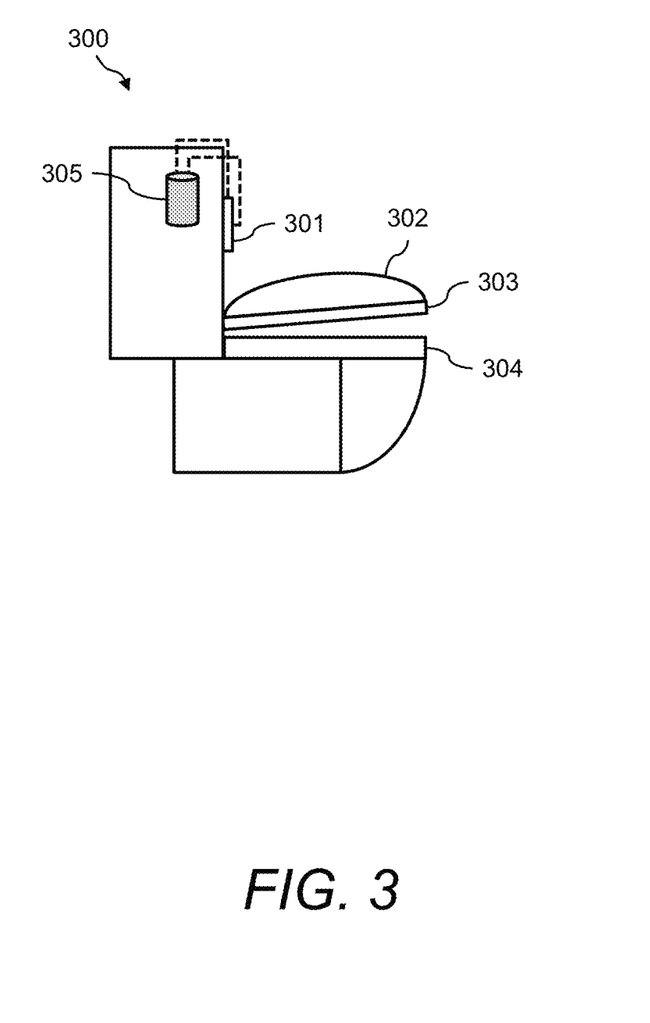
FIG. 3 illustrates an example of the power generation device mounted within a toilet and connected to various devices that need to be powered.

Referring now to FIG. 3 is an example of the power generation device mounted within a toilet and connected to various devices that need to be powered. For example, a cell 305 is placed in the flush tank of a toilet 300. The cell 305 is connected to an LED that is placed over the flush tank 301 so that this combination can just be inserted on the rim of the flush tank easily without any additional wiring. Such an LED can also be mounted on the toilet seat cover 302 or the toilet seat 303 or in the rim 304 of the toilet bowl or anywhere else around the toilet with additional wiring that connects to the power source. It is conceivable that a battery can be connected to the cell to store the energy. Additionally, such power generated can be utilized to drive other electronic and mechanical elements as required.

Figure 4:
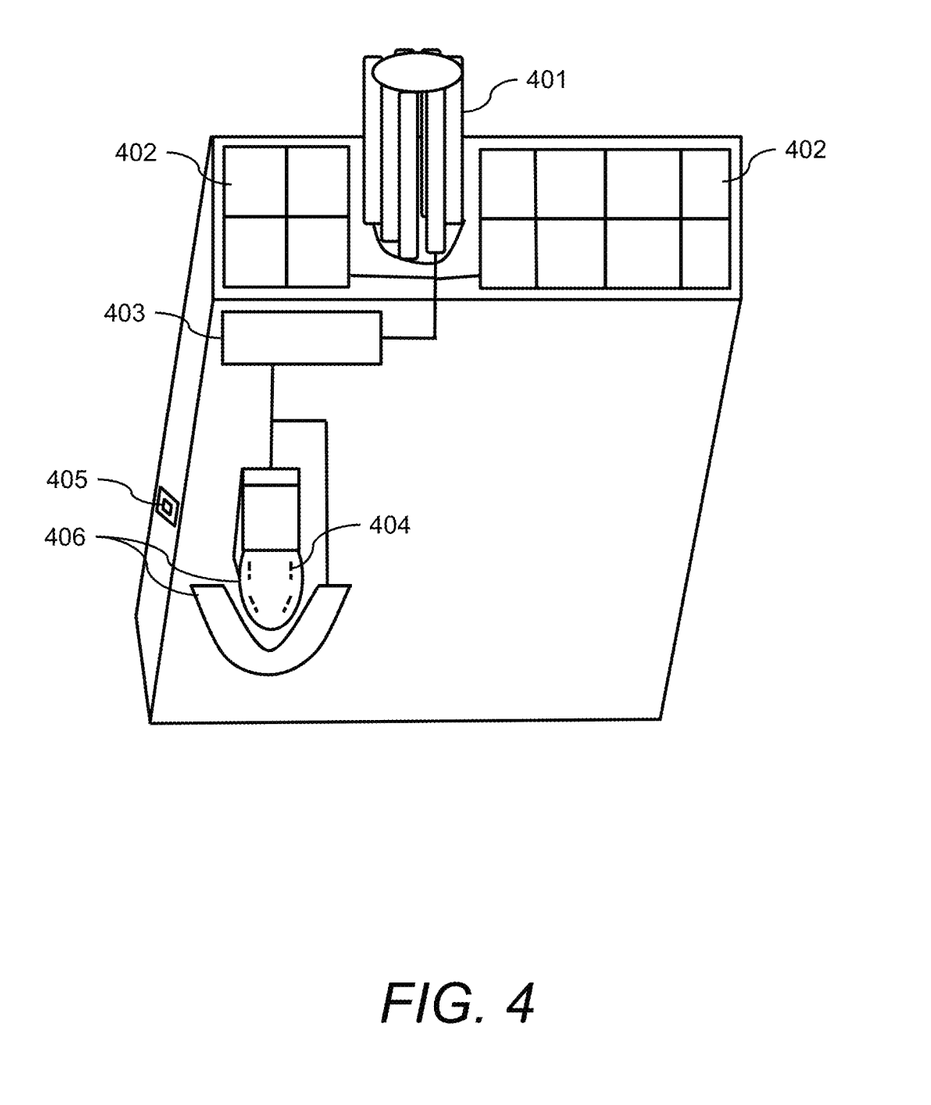
FIG. 4 illustrates an example of how a wind turbine, piezo ceramic, and solar panel combine to charge a battery that powers a USB port.

Referring now to FIG. 4 is an example of how a wind turbine, piezo ceramic, and solar panel combine to charge a battery that powers a USB port. For example, in FIG. 4, a framework is shown that includes four sources of energy that can be utilized in a portable toilet device: (1) a wind turbine 401, (2) solar panels 402, (3) toilet bowl electrode batteries 404, and (4) piezo 406 in the stool/seat. The wind turbine 401 can be used in two situations. When the portable toilet is stationary and the wind is blowing, the turbine will turn and generate energy. Also, when the portable toilet is being transported, the turbine can generate energy as long as it is exposed to the air and the wind speed is below a certain threshold (generally 55 mph but can vary depending on the exact type of wind turbine used). The solar panels 402 can also generate energy as long as they are exposed to sunlight. One or more batteries 404 may be placed in the toilet bowl (see also FIG. 5). These batteries 404 can vary in exact number and placement, but will be located in either the toilet bowl (for portable toilets) or in the flush tank (for toilets inside a home). There can also be piezo ceramic placed in one or both of the locations depicted by 406: on the feet of the stool and directly underneath the seat of the toilet so that it is compressed when a user sits down. These four sources of power generation may be set up to all simultaneously charge a rechargeable battery 403 which can in turn power several features, one of which is a USB charging port 405.

Figure 5:
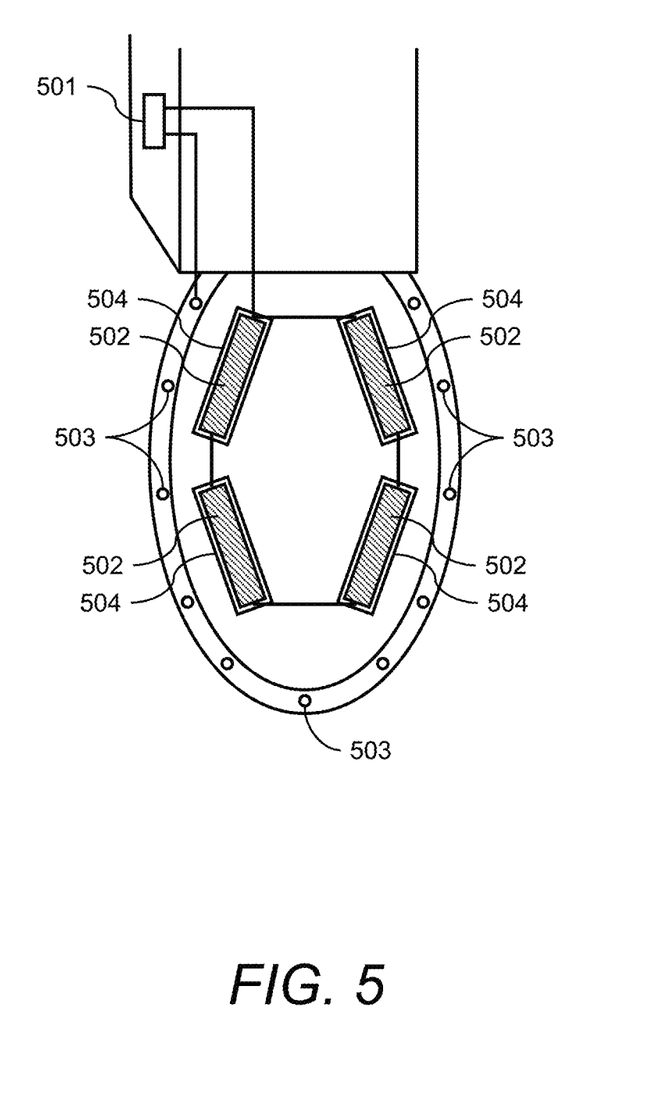
FIG. 5 illustrates an example of how a battery within the bowl of the toilet could contain a battery that would power LEDs in places including, but not limited to, the toilet seat, the seat cover, and the base of the toilet.

Referring now to FIG. 5 is an example of how a battery within the bowl of the toilet could charge a battery that would power LEDs in places including, but not limited to, the toilet seat, the seat cover, and the base of the toilet. For example, FIG. 5 shows one possible setup of the toilet bowl electrodes for a portable toilet. The batteries 502 can sit in the toilet arranged in some pattern with each battery 502 typically in a protective barrier 504 to prevent damage and a reduction in the performance or lifetime thereof. The possibility depicted is that the batteries 502 would charge a battery 501. The battery 501 would then power a number of LEDs 503. However, an alternative, amongst others, could be that the batteries directly power the LEDs and bypass a battery.

Figure 6A:
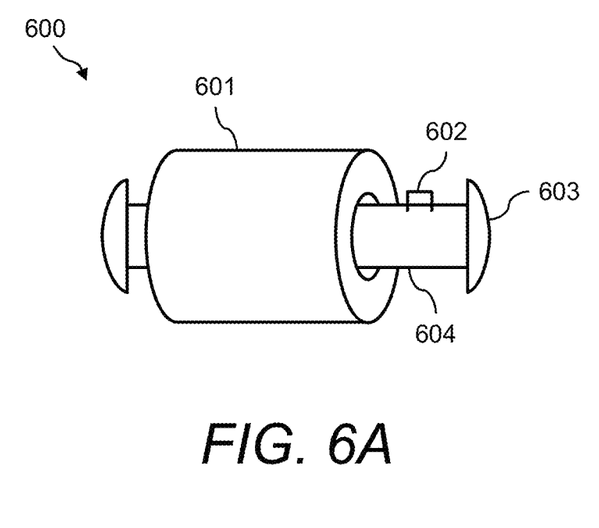
FIG. 6A and FIG. 6B illustrate an example of a mechanism that can alert the user via a bright LED when the toilet paper roll is empty.
Figure 6B:
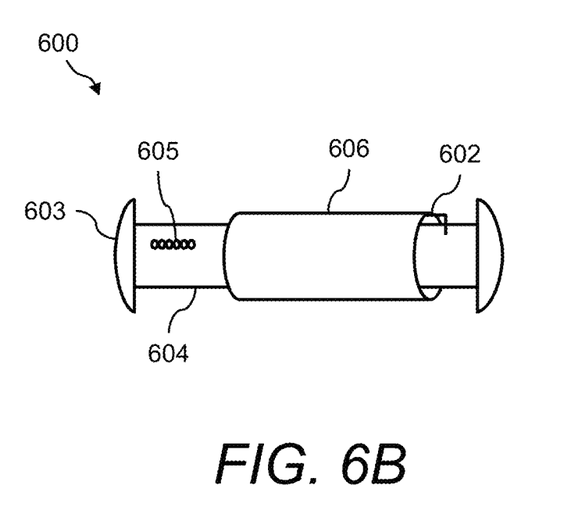

Referring now to FIG. 6A and FIG. 6B is an example of a mechanism that can alert the user via a bright LED when the toilet paper roll is empty. For example, FIG. 6A and FIG. 6B shows a toilet paper holder 600. FIG. 6A shows the toilet paper roll 601 on the holder bar 604 when it still has paper on it. Once the toilet roll becomes empty, the last user will slide the roll over so that the switch 602 goes from an un-pressed position to a pressed position. Instead of a switch, the light can also be activated by a photosensor which remains covered with the toilet paper roll till it is moved. The caps 603 may prevent the roll from sliding off either end. FIG. 6B shows the toilet paper holder 600 once the roll has been moved. The now empty toilet paper roll 606 reveals a series of LED lights 605 that can alert toilet users when the toilet paper is used up so that they might be prompted to get more paper before using the toilet.

Figure 7A:
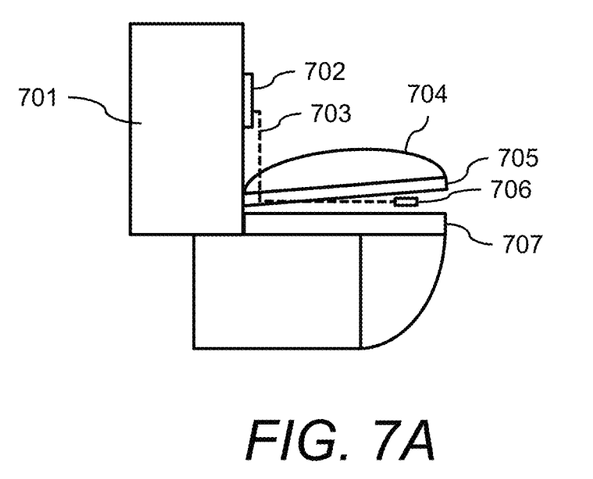
FIG. 7A and FIG. 7B illustrate examples of the locations of piezoelectric generators and the rechargeable battery on the toilet.
Figure 7B:
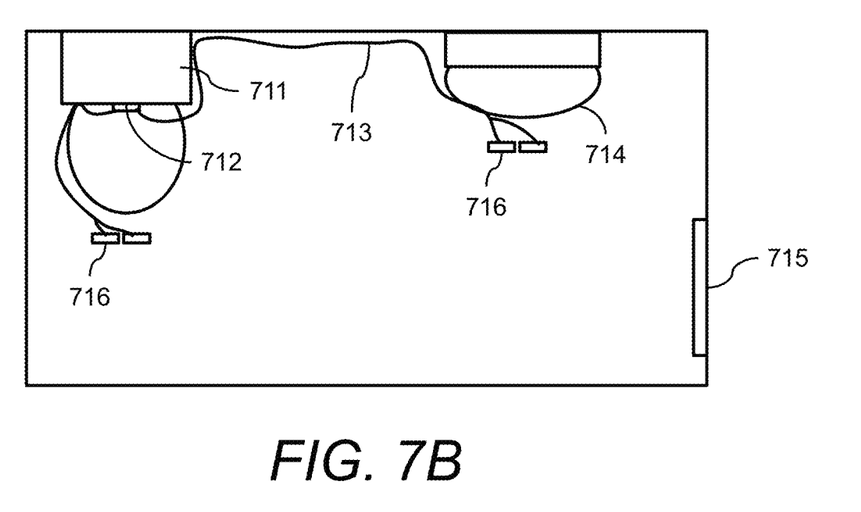

Referring now to FIG. 7A and FIG. 7B are examples of the locations of piezoelectric generators and the rechargeable battery on the toilet. For example, FIG. 7A shows where the piezoelectric generators 706 and rechargeable battery 702 can be located in relation to the other parts of the toilet. This includes: (1) the base of toilet 701, (2) the seat cover 704, (3) the seating rim 705, and (4) the toilet bowl rim 707. The generators, including two generators, are located between the seating rim and the toilet bowl rim, where pressure would normally be applied when sitting. FIG. 7A also shows an example of how the wiring 703 can be set up, connecting the generators to the battery 702. For example, the wiring 703 may run below the seating rim and turns to the battery at the cover and seating hinges of the toilet.

Further, FIG. 7B shows an example of the location of the piezoelectric generators 716 placed underneath the floor mat or tiles around the bathroom, based on where a person's feet would be placed. There are two generators located in front of the toilet 711 where one's feet would be when sitting, and two generators in front of the sink 714 where one's feet would be when washing their hands. FIG. 7B also shows how the generators connect to the battery 712. The wires 713 are placed as close to other objects as possible so to avoid any contact with people walking to and from the toilet and sink and bathroom door 715.

Figure 8:
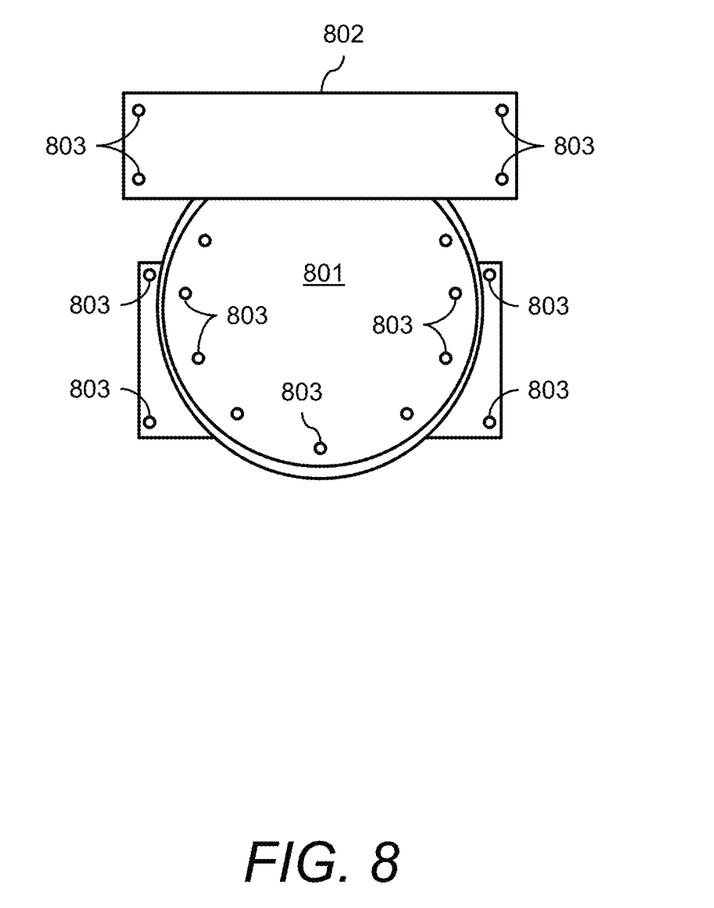
FIG. 8 illustrates an example of the placement of LEDs around the toilet.

Referring now to FIG. 8 is an example of the placement of LEDs around the toilet. For example, FIG. 8 shows where each night-light LED 803 can be placed around the toilet. For example, there are nine LEDs 803 placed on the toilet seat cover 801, four LEDs 803 placed on top of the flush tank 802, and four LEDs 803 placed where the toilet's ground screws would be. These LEDs 803 are all powered by the external battery.

Figure 9:
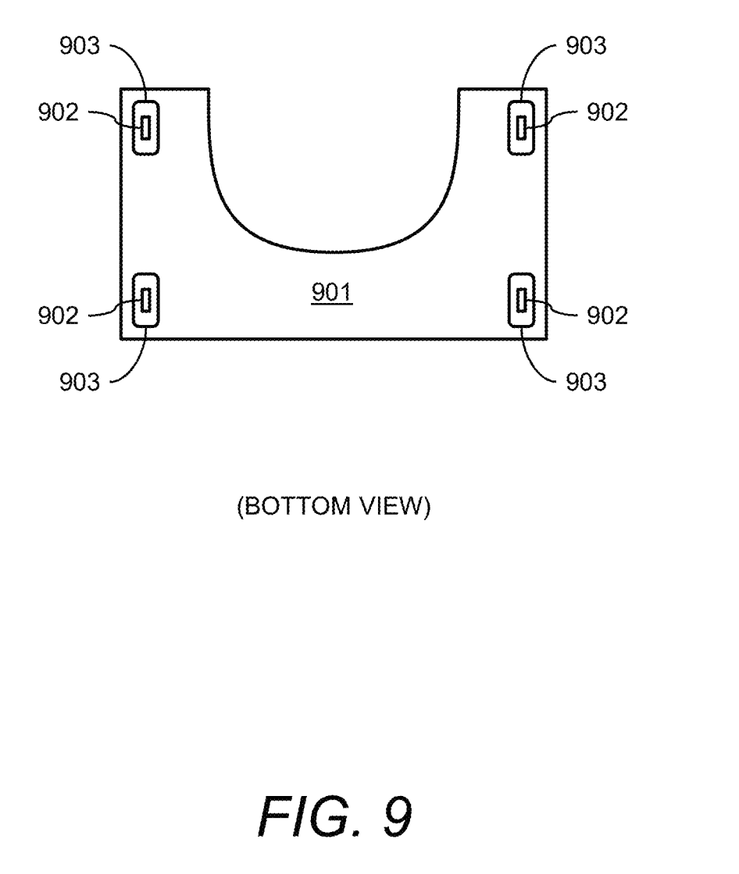
FIG. 9 illustrates an example of the piezoelectric generators underneath the legs of a toilet stool device.

Referring now to FIG. 9 is an example of the piezoelectric generators underneath the legs of a toilet stool, such as the Squatty-Potty®. For example, FIG. 9 (i.e., a bottom view of a stool shows where the piezoelectric devices 902 are located on the stool 901. There are, for example, four piezoelectric devices 902, each placed on the bottom of the feet 903 of the stool 901. This is where pressure would be applied if someone places their legs on the stool 901. The LEDs can be powered by these piezoelectric generators.

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some embodiments, ±100% in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Although the foregoing subject matter has been described in some detail by way of illustration and example for purposes of clarity of understanding, it will be understood by those skilled in the art that certain changes and modifications can be practiced within the scope of the appended claims.

That which is claimed:

1. A power generation system for a toilet device, comprising:
   a portable toilet component having a source of standing water and comprising a toilet base, a toilet seat comprising a seating rim, and a toilet bowl rim;
   an electrical improvement; and
   a power generation component operatively connected to the portable toilet component, wherein the power generation component is discrete from an electrical grid and is adapted to power the electrical improvement, wherein the power generation component comprises two or more piezoelectric generators located between the seating rim and the toilet bowl rim, and at least two of the two or more piezoelectric generators are arranged at a pressure points of contact when the portable toilet component is used by a user.

2. The system of claim 1, further comprising at least one of another power generation component, wherein the another power generation component is selected from the group consisting of a wind turbine, solar panels, and electrode batteries.

3. The system of claim 2, wherein the portable toilet component further comprises a floor adjacent to the toilet base, and wherein the power generation component further comprises one or more additional piezoelectric generators and the one or more additional piezoelectric generators are beneath the floor.

4. The system of claim 1, wherein the portable toilet component further comprises a toilet paper holder and the electrical improvement is a an LED alert light integrated into the toilet paper holder, wherein the LED alert light adapted to be turned on once toilet paper needs to be replaced.

5. The system of claim 1, wherein one or more of the piezoelectric generators comprise a piezo ceramic.

6. The system of claim 1, wherein the portable toiler component comprises a toilet stool having a plurality of feet.

7. The system of claim 6, wherein a piezoelectric generator is affixed to each of the plurality of feet.

8. The system of claim 1, wherein the power generation component is operatively connected to charge a rechargeable battery.

* * * * *